United States Patent [19]

Eiermann et al.

[11] 4,449,402
[45] May 22, 1984

[54] APPARATUS FOR MEASURING THE FLOW VELOCITY OF GASES AND LIQUIDS

[75] Inventors: Kurt Eiermann, Pfungstadt; Eberhard Horlebein, Mainaschaff; Kurt Lissmann, Rodenbach; Wolfgang Schafer, Frankfurt, ail of Fed. Rep. of Germany

[73] Assignee: Degussa Aktiengesellschaft, Hanau, Fed. Rep. of Germany

[21] Appl. No.: 388,463

[22] Filed: Jun. 14, 1982

[30] Foreign Application Priority Data

Jul. 9, 1981 [DE] Fed. Rep. of Germany ....... 3127081

[51] Int. Cl.³ .............................................. G01F 1/68
[52] U.S. Cl. ................................................... 73/204
[58] Field of Search ............. 73/118 A, 204; 338/217, 338/279, 280, 292, 308

[56] References Cited

U.S. PATENT DOCUMENTS 4,213,335  7/1980  Peter et al. ............................ 73/204
4,300,391  11/1981  Eiermann ............................. 73/204

Primary Examiner—Herbert Goldstein
Attorney, Agent, or Firm—Cushman, Darby & Cushman

[57] ABSTRACT

There is described an anemometer for the measurement of the flow velocity of gases and liquids particularly for the measurement of the intake air of internal combustion engines whereby the heated resistances are film resistance made of a metal layer and carrier, should have the shortest possible response time. This is attained by so dimensioning the flow paths (6) in the metal layer (1) that the resulting resistance per unit of surface area stands in a constant ratio to the local heat transfer coefficient.

7 Claims, 3 Drawing Figures

APPARATUS FOR MEASURING THE FLOW VELOCITY OF GASES AND LIQUIDS

BACKGROUND OF THE INVENTION

The invention is directed to an apparatus for the measurement of the velocity of flow of gases and liquids, particularly the intake air of internal combustion engines, with one or more temperature dependent electrical resistances, which are in heat contact with the flowing medium, whereby one or more of the electrical resistances are heated with the help of a control circuit and the heated resistance or resistances are film resistances, consisting essentially of or consisting of a thin metal layer on an electrically insulating carrier.

In the interest of maintaining the purity of the air it is necessary to reduce the toxic materials produced by internal combustion engines, especially from automobiles. This object is attained inter alia by an improvement of the course of combustion. For this purpose it is necessary that the most exact information be available as to the amounts of air taken in in each case, namely with a smallest possible delay in time.

There have already been proposed hot wire anemometers of various constructions for the measurement of the amount of air taken in by internal combustion engines. The decisive disadvantage of customary hot wire anemometers is that dirt particles entrained in the air sucked in deposit on the heated resistance and through this change the gauging characteristics of the emission of heat.

In Eiermann U.S. application Ser. No. 304,052, filed Sept. 21, 1981, the entire disclosure of which is hereby incorporated by reference and relied upon), it was taught to use a metal film resistance which has the form of a plate which is aligned parallel to the direction of flow and the narrow side turned to the flow is coated with a heat insulating protective layer. Through this construction the influence of the dirt can be suppressed in satisfactory manner.

The electrical resistance of such a metal film resistance is advantageously brought to a desired value by producing cuts in the metal layer with a laser so that there is formed a meandering flow path. Customarily in such metal film resistances the geometry of the resistance paths is so chosen that the resistance produced per unit of surface area is distributed nearly equally over the entire resistance surface.

The response times producible with such a metal film resistance with sudden change of the flow velocity, however, for the most part are not sufficient to fulfill the necessary requirements for the control of an internal combustion engine. It is known that the response times of such an anemometer with heated metal film resistance are the shorter the smaller the thickness of the carrier material. However, this cannot be reduced arbitrarily since, based on the structure, the heated resistance must be self supporting and sufficiently mechanically stable.

Therefore it was the problem of the present invention to develop an apparatus for the measurement of the flow velocity of gases and liquids, especially the intake air of internal combustion engines with one or more temperature dependent electrical resistances which are in heat contact with the flowing medium whereby one or more of the electrical resistances is heated with the help of a control circuit and in which the heated resistance or resistances are film resistances consisting essentially of or consisting of a thin metal layer on an electrically insulating carrier of the type that the dirtying effect is suppressed to a satisfactory extent and there is attained a shortest possible response time with change of the air velocity.

SUMMARY OF THE INVENTION

This problem was solved according to the invention by so dimensioning the flow paths produced in the metal layer that the resulting electrical resistance per unit of surface area stands in a constant ratio to the local heat transfer coefficient. The local heat transfer coefficient $\alpha$ thereby is at the given temperature difference $\Delta T$ between the heated surface and flowing fluid a measure of the heat flow P carried away locally per unit of surface area.

$$\alpha = (P/\Delta T)$$

Through this procedure surprisingly the response time can be decisively shortened.

DETAILED DESCRIPTION

Figure 1:
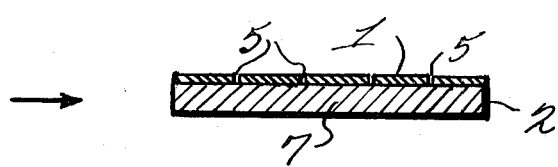
FIG. 1 schematically shows in cross-section an illustrative form of the device of the invention.

FIG. 1 shows the cross section through a film resistance 7 consisting of a thin metal layer 1 on an electrically insulating carrier body 2. This film resistance has the form of a plate which is aligned parallel to the direction of flow of the medium to be measured. The local heat transfer coefficient of such a heated resistance decreases in characteristic manner in the flow direction with increasing distance from the edges flowed against.

Figure 2:
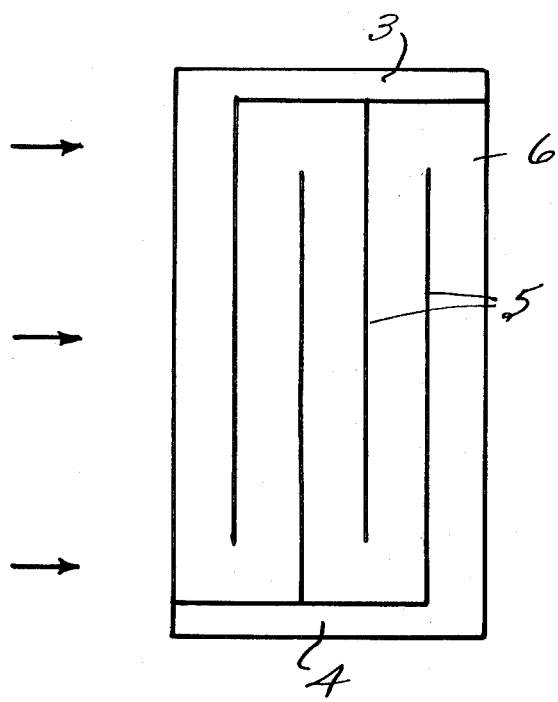
FIG. 2 is a plan view of a film resistance of the customary type.
Figure 3:
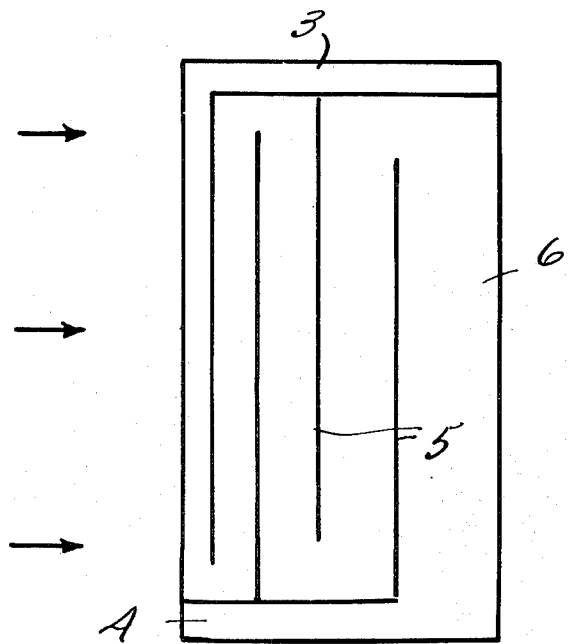
FIG. 3 is a plan view of the film resistance of the invention.

FIGS. 2 and 3 show the plan view of the metal layer 2 of such a film resistance.

FIG. 2 schematically shows a film resistance of the customary type. Between the contact surfaces 3 and 4 advantageously with laser cuts 5 which sever the metal film 1, but not the carrier 2, there is produced a meandering flow path 6. The resistance produced by this means per unit of surface area is nearly constant on the total surface. In order to measure flow velocity, such a resistance which should have as high a temperature coefficient as possible, is heated in known manner with the help of an electrical control circuit, so that there is established a constant excess temperature i.e. a constant average resistance value. Through the fact that the heat-flux density drawn off by the flowing decreases with increasing distance from the edges flowed against, there is established a temperature profile along the flow direction.

The form of this temperature profile depends on the flow velocity, the heat conductivity and the geometry of the carrier body. The change of the temperature profile dependent upon the flow velocity causes the relatively large response time of this known arrangement.

FIG. 3 shows a resistance according to the invention. The meandering flow path 6 in this case is so designed that the resistance per unit of surface area and therewith also the heat production density in the flow direction decreases, namely in the same measure as the drawn off heat-flux density. Through this the temperature of the entire resistance is held constant independent of the flow velocity. This leads to a considerable shortening of the response time.

Preferably the film resistances have the form of a plate and are aligned parallel to the flow direction of the fluid being measured, in which case the electrical resistance per unit of surface area in the flow direction with increasing distance from the plate edges flowed against decreases in the same ratio as the local heat transfer coefficient. Besides, it is frequently of advantage to cover the flowed against narrow side of the plate with a heat insulating protective layer and the metal layer with a thin, good heat conducting protective layer.

What is claimed is:

1. An anemometer apparatus for the measurement of velocity of a flowing medium comprising:
   a temperature dependent electrical film resistance positioned so as to be in heat contact with said flowing medium, said resistance comprising an electrically insulating carrier and a thin metal layer formed on said carrier, said thin metal layer being cut to define resistance paths dimensioned such that the resistance per unit of surface area is a constant ratio to a corresponding local heat transfer coefficient; and
   a control circuit for heating said resistance.

2. An anemometer according to claim 1 wherein the film resistance is in the form of a plate which is aligned parallel to the direction of flow whereby the electrical resistance per unit of surface area in the direction of flow decreases with increased distance from the edge flowed against in the same ratio as the local heat transfer coefficient.

3. An anemometer according to claim 2 wherein the flowed against narrow side of the plate is covered with a thin, good heat insulating protective layer.

4. An apparatus according to claim 1 wherein the flowed against narrow side of the plate is covered with a heat insulating protective layer.

5. An anemometer according to claim 1 wherein said medium is fluid.

6. An anemometer according to claim 1 wherein said medium is a gas.

7. An anemometer according to claim 1 wherein the flowing medium is the air intake of an internal combustion engine.

* * * * *